United States Patent [19]

Phillips

[11] Patent Number: 4,930,225

[45] Date of Patent: Jun. 5, 1990

[54] DECK BOARD SPACER AND NAILING GUIDE

[76] Inventor: Charlotte N. Phillips, 10401 SW. 35th St., Portland, Oreg. 97219

[21] Appl. No.: 310,899

[22] Filed: Feb. 16, 1989

[51] Int. Cl.$^5$ ........................... G01B 3/30; G01B 3/32

[52] U.S. Cl. ........................................ 33/526; 33/562; 33/613

[58] Field of Search ................. 33/613, 518, 526, 527, 33/DIG. 20, 562

[56] References Cited

U.S. PATENT DOCUMENTS

| | | | |
|---|---|---|---|
| 2,686,959 | 8/1954 | Robinson | 33/613 |
| 2,744,334 | 5/1956 | Jondole | 33/613 |
| 2,911,022 | 11/1959 | Brown | 33/613 X |
| 3,735,497 | 5/1973 | Boettcher | 33/526 |
| 3,775,856 | 12/1973 | Schmidt | 33/518 |
| 4,625,415 | 12/1986 | Diamontis | 33/562 X |
| 4,850,114 | 7/1989 | Vockins | 33/526 |

*Primary Examiner*—Daniel M. Yasich
*Attorney, Agent, or Firm*—Richard C. Litman

[57] ABSTRACT

A guide or fixture for use in the building construction trade includes a variety of features to allow the construction of decks, fences and the like to proceed more easily and quickly. The features include a flange which may be inserted between individual planks to provide for proper spacing of the planks, holes for proper positioning of nails or screws, a scale for linear measurement, and edges on one surface which serve as marking or cutting guides for the material used in such construction. One marking or cutting guide edge is preferably a 45 degree angle to the flange edge, thus allowing planks to be cut for diagonally patterned decks, fences or roof sheathing. The cutting guide edges, main surface, flange, and scale may be made in a variety of angles or dimensions in order to be useful with a variety of lumber sizes or deck or fence patterns. In an alternate version, the flange may extend symmetrically on both sides of the edge to which it is attached, so that either portion of the flange may be used as above while the opposite portion may be used as a handle.

10 Claims, 2 Drawing Sheets

FIG. 1
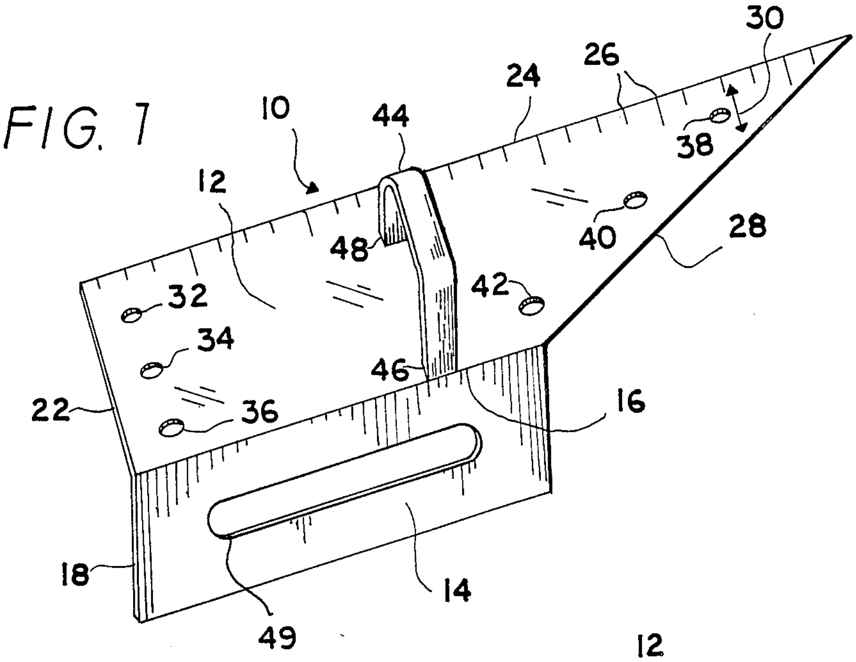
FIG. 2
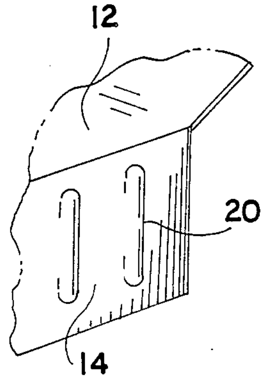
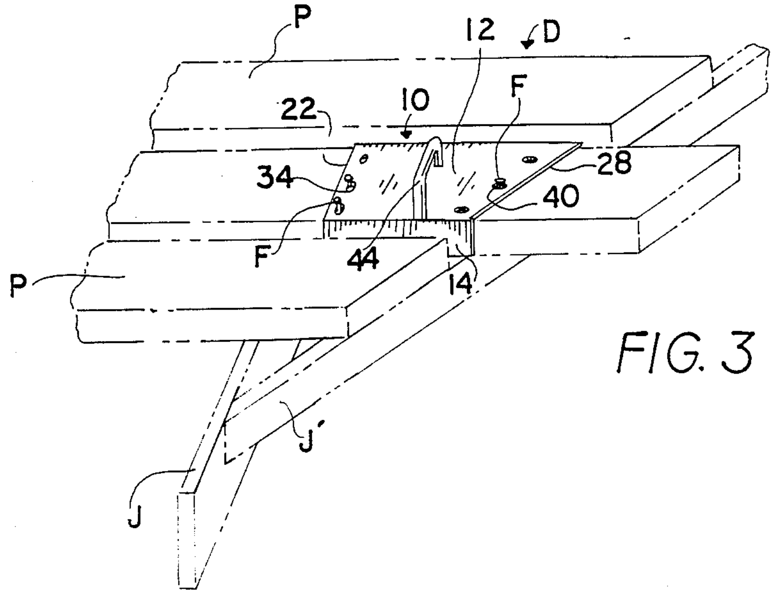
FIG. 3

DECK BOARD SPACER AND NAILING GUIDE

FIELD OF THE INVENTION

This invention relates generally to jigs, fixtures and guides used in the building construction industry, and more specifically to an improved device for insuring the proper spacing and installation of planking and fasteners in the construction of patio decks, planking, and roof sheathing, and the like.

BACKGROUND OF THE INVENTION

The building construction trade is a relatively fast paced industry; a great deal of pressure is exerted on those engaged in such labor to work as quickly as possible, particularly as favorable weather permits. However, the major portion of such work is hand labor; very little has been accomplished in the way of mass production methods, or the development of tools and equipment, other than electrical power tools, to permit those engaged in the building construction trade to work more rapidly and efficiently.

One of the more time consuming tasks in the trade is the precise alignment, spacing, and cutting of construction members such as deck, fence, or roof sheathing. The methods used to date have been relatively crude, involving the use of nails as makeshift spacing guides, and the experience and judgment of the worker. The need arises for a fixture which allows the worker to quickly, efficiently, and accurately cut, align, and secure decking boards and the like.

DESCRIPTION OF THE RELATED ART

Devices providing solutions for some of the above problems have been developed in the past. Brown U.S. Pat. No. 2,911,022 discloses a nailing jig for the purpose of precisely locating and nailing vertical studs to floor and ceiling plates in standard building construction. Diamontis U.S. Pat. No. 4,625,415 performs the same function, as well as providing the proper spacing between studs. Neither of these devices is adaptable to use in aligning relatively closely spaced boards as used in deck, fence or roofing construction and the like.

Tanner U.S. Pat. No. 4,766,782 discloses a device for the precise alignment of nails and/or screws during construction. No provision is made, however, for the proper spacing or alignment of the boards or materials to be secured together through the use of this device.

SUMMARY OF THE INVENTION

By the present invention, an improved device for the precise locating, spacing, and fastening of closely spaced boards or planks for deck, roof, and fence construction, or the like, is disclosed.

Accordingly, one of the objects of the present invention is to provide an improved device for the proper and precise alignment of such closely spaced boards.

Another object of the present invention is to provide a device capable of serving as a guide for the precise measuring, marking, and/or cutting of such boards at a variety of angles.

A further object of the present invention is to provide a device serving as a guide for the proper and precise spacing and location of nails or other fasteners in such boards.

An additional object of the present invention is to provide a device which may perform the above functions with a variety of standard lumber sizes.

Yet another object of the present invention is to provide a device which will protect the material upon which it is being used from hammer marks or other defacement.

Still another object of the present invention is to provide a device which, in combination with the above functions, may also be used as a linear measuring device or scale.

Another object of the present invention is to provide a device serving all of the above functions and is compact, portable, and durable.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a perspective view of the device, disclosing its features.

FIG. 2 is a fragmented perspective view of a portion of the device containing an alternative embodiment.

FIG. 3 is a perspective view of the device as it appears in use.

Similar reference characters designate corresponding parts throughout the several figures of the drawings.

DESCRIPTION OF THE PREFERRED EMBODIMENT

Figure 4:
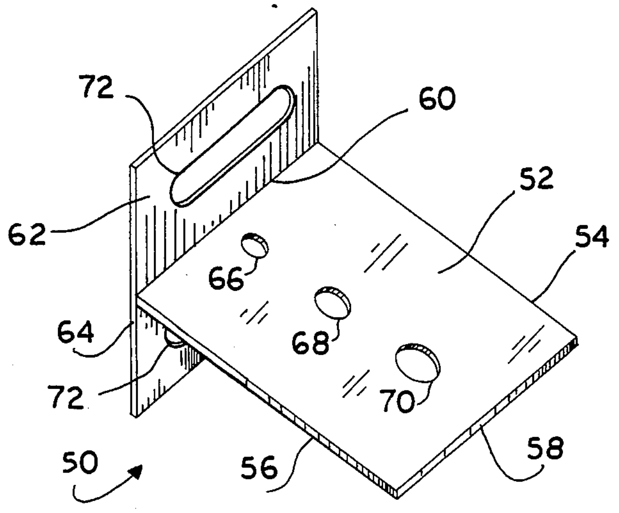
FIG. 4 is a perspective view of an alternate embodiment of the device of FIGS. 1 through 3.

Referring now to the drawings, particularly FIG. 1, the present invention will be understood to relate to an improved tool 10 for quickly and easily cutting, spacing, and securing boards and planks used in deck, roof, or fence construction, and the like. Tool 10 comprises an essentially trapezoidal planar surface 12 in combination with a depending flange 14 attached to edge 16 of surface 12 by welding or other suitable means, or surface 12 and flange 14 may be stamped or formed from a single piece of material. The angle formed by surface 12 and flange 14 is preferably 90 degrees.

Flange 14 is of a thickness 18 so as to form the proper spacing between planks P as they are placed to form a deck D or other structure of relatively closely spaced planks P, as shown in FIG. 3. An alternate embodiment is shown in FIG. 2 in which depending flange 14 may be formed from a thinner material with a plurality of protrusions or ribs 20 stamped or otherwise formed in flange 14 in order to provide the proper thickness. The height of flange 14 is preferably equal to or less than that of the thickness of the planks P normally used for such deck construction and the like.

Planar surface 12 is preferably formed with an edge 22 at a 90 degree angle to that of edge 16. Edge 22 may then serve as a marking or cutting guide for lumber or material to be cut square to its length, aligned with edge 16 by placing tool 10 over a plank P with surface 12 atop the plank and flange 14 immediately adjacent and parallel to the side of the plank. Edge 22 is preferably of a length approximately equal to the width of planks P normally used in deck construction or the like, but of course may be made in any width desired.

Edge 24 of surface 12 is preferably formed at a 90 degree angle to edge 22, and therefore is parallel to edge 16 of surface 12. Edge 24 may also contain markings 26 providing a graduated scale for the measurement of various linear dimensions normally encountered in the building construction field. Preferably, edge 24 is of sufficient length so as to provide a graduated scale of at least 12 inches, but may of course be of any suitable length.

Edge 28 of planar surface 12 is at an included angle 30 of less than 90 degrees to edge 24. Preferably, angle 30 is 45 degrees, which provides a marking and cutting guide for planks P or material to be installed at a 45 degree diagonal angle. Obviously angle 30 may also be constructed at angles other than 45 degrees, such as 30 or 60 degrees or other angles, with the length of edge 28 and therefore the length of edge 16 changing correspondingly.

Nailing guides 32 through 42 are provided by openings in surface 12. Guides 32 through 36 provide a guide for nails or other fasteners F, shown in FIG. 3, to be installed perpendicular to the longitudinal dimension of planks P or other material. Guide 34 is formed in surface 12 equidistant from edges 16 and 24, with guides 32 and 36 spaced equally either side of guide 34 so as to provide sufficient distance from edges 16, 22, and 24 for the proper installation of nails or other fasteners F. Guides 32 through 42 are each of sufficient diameter to easily allow the passage of a common nail head generally used in such construction, or other standard fastener F.

Guides 38 through 42 are formed in surface 12 parallel to edge 28. Guide 40 is installed equidistant between edge 24 and a line forming an extension of edge 16, and guides 38 and 42 are installed equidistant from guide 40 on either side and in a like manner to that of guides 32 through 36, each spaced equally from edge 28 a sufficient distance to allow the proper installation of nails or other fasteners F. Guides 38 through 42 are of a size equal to guides 32 through 36.

Tool 10 may also be equipped with a handle 44 for convenience. Handle 44 is of a generally U—shaped configuration and may be attached to surface 12 at point 46 contiguous to flange 14 and at point 48 so as to be clear of graduated scale markings 26, or may be of any other suitable configuration and location on surface 12, opposite the flange 14. Alternatively, a slot 49 may be formed in flange 14 to enable the user to grasp tool 10 conveniently.

The function of tool 10 is shown in FIG. 3. In typical frame deck construction or the like, joists J are overlaid with a plurality of planks P at a 90 degree angle to joists J. By placing tool 10 on a given plank P so that planar surface 12 lies over the upper surface of the plank and flange 14 depends aside and rests against the shorter dimension of plank P, edge 22 of tool 10 may be used to accurately mark a plank P for cutting or other purpose. In a similar manner, edge 28 of tool 10 may be used to accurately mark boards or planks P at an angle other than 90 degrees, as shown at joist J'.

Guides 32 through 42, shown most clearly in FIG. 1, may be used as shown in FIG. 3 for the proper positioning of nails or other fasteners F to secure planks P to joists J. by placing tool 10 on a given plank P in the manner described above at the desired location, nails or other fasteners F may be accurately driven through planks P into joists J - J', insuring proper spacing between each fastener F, and the fasteners and the edge of planks P.

The proper spacing between planks P in such construction is critical. Tool 10 provides means to quickly and accurately space such planks P during construction. By placing tool 10 on a given plank P so that flange 14 is between two adjacent planks P, the proper spacing of the planks P is assured. This provides assurance of proper drainage between such planks P, freedom from interference due to swelling with increases in moisture content, etc. Tool 10 assures that this proper spacing is consistent at each end of the space, thus assuring that all planks P are parallel throughout the construction. As guides 32 through 42 are somewhat larger than the heads of the nails or fasteners F generally used in such construction, tool 10 may be easily removed after any marking, spacing, measuring, cutting or securing operation on planks P and repositioned for the next operation.

The device may also be constructed in a more compact form, as shown in the tool 50 of FIG. 4. In this embodiment, planar surface 52 is of essentially rectangular shape, with edges 54 and 56 of equal length, preferably equal to the width of the standard planks or boards normally used in the construction of decking and the like. Edges 58 and 60 are preferably shorter than edges 54 and 56 for ease of storage when not in use, but of course may be manufactured in any length desired.

Flange 62 is joined to surface 52 along edge 60 and extends approximately equally above and below edge 60. Flange 62 and surface 52 may be joined by welding or other suitable means. In this embodiment, tool 50 appears as a capital letter "T" when viewed on edge, with flange 62 forming the crossmember of the "T" and surface 52 forming the stem. Flange 62 may be formed of a thickness 64, in order to allow the proper spacing between boards or planks, in the same manner as that of thickness 18 of tool 10. Obviously, flange 62 may be formed of a thinner material and protrusions or ribs similar to ribs 20 of FIG. 2 may be used to develop the proper thickness for flange 62. Openings 72 may also be provided in flange 62 to provide a handle means for the user of tool 50, in a manner similar to that provided by slot 49 of tool 10.

Openings 66, 68 and 70 are provided through surface 52 in the same manner as that of tool 10. Opening 68 is preferably centered in surface 52, with openings 66 located between opening 68 and edge 60 and opening 70 located between opening 68 and edge 58. In this manner openings 66 through 70 may be used as guides for the proper location of fasteners in the manner of openings 32 through 42 of tool 10.

By arranging flange 62 in the manner described above relative to surface 52, tool 50 may be more quicklY and easilY used due to its symmetrical nature. Either side of flange 62 may be inserted between planks to allow the proper spacing while the opposite portion of flange 62 may serve as a handle. Typically, this embodiment is of a smaller size than that of tool 10, which allows easier storage and portability.

It is to be understood that the present invention is not limited to the sole embodiment described above, but encompasses any and all embodiments within the scope of the following claims.

I claim:

1. A tool for use in marking, cutting, spacing, and/or securing boards or planks in deck, roof, or fence construction, and the like, comprising;

a continuous trapezoidal planar surface for placement on the top surface of a plank.

said trapezoidal planar surface including a flange 14 of a proper thickness to provide proper spacing between adjacent boards or planks, perpendicularly attached to one edge of said an edge on said trapezoidal planar surface parallel to said flanged one edge, and a plurality of apertures disposed through said trapezoidal planar surface and arranged in a straight line of a size and position to allow the proper spacing of nails or other fasteners.

2. A tool according to claim 1 wherein;

at least one edge of said planar surface adjacent to said flanged edge is at an angle of 90 degrees to said flanged edge.

3. A tool according to claim 1 wherein;

at least one edge of said planar surface adjacent to said flanged edge is at an angle of 45 degrees to said flanged edge.

4. A tool according to claim 1 wherein;

said planar surface edge opposite said flanged edge contains a graduated scale for linear measurement.

5. A tool according to claim 1 wherein;

the distance between said parallel edges is equal to or less than $5\frac{1}{2}$ inches.

6. A tool according to claim 1 wherein;

the distance from at least one outer edge of said flange to the attachment of said flange to said planar surface is equal to or less than $1\frac{1}{2}$ inches.

7. A tool according to claim 1 wherein;

said flange contains a plurality of ribs or other protrusions to provide the thickness for proper spacing of said adjacent boards or planks.

8. A tool according to claim 1 wherein;

said planar surface contains a handle attached to one side of said planar surface.

9. A tool according to claim 1 wherein;

said perpendicular flange depends from said planar surface edge in a direction opposite the side to which said handle may be attached.

10. A tool according to claim 1 wherein;

said flange contains an opening of appropriate size and shape, whereby the user of said tool may grasp said flange by means of said opening, thereby using said flange as a handle.

* * * * *